United States Patent
Miyamoto et al.

(10) Patent No.: US 8,849,496 B2
(45) Date of Patent: Sep. 30, 2014

(54) BATTERY ENERGY EMERGENCY ROAD SERVICE

(75) Inventors: Naoya Miyamoto, Tochigi (JP); David S. DeWitt, Torrance, CA (US); Ryan Douglas Roy Harty, Long Beach, CA (US); Robert M. Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 76 days.

(21) Appl. No.: 13/101,505

(22) Filed: May 5, 2011

(65) Prior Publication Data

US 2012/0283899 A1 Nov. 8, 2012

(51) Int. Cl.
G01C 21/00 (2006.01)
G06F 17/00 (2006.01)
G01C 21/36 (2006.01)
G01C 21/34 (2006.01)

(52) U.S. Cl.
CPC .......... *G01C 21/362* (2013.01); *G01C 21/3407* (2013.01)
USPC ......... 701/29.2; 701/300; 701/301; 701/31.4; 701/32.4; 701/467

(58) Field of Classification Search
CPC ........... G01C 21/3469; G01C 21/3682; G01C 21/3697; G01C 21/26; G01C 21/362; B60L 11/1861; B60L 2240/622; B60L 2240/72; B60L 2260/52; B60W 2550/402; B60W 50/029; Y02T 90/161
USPC ............. 701/29.2, 31.5, 31.4, 32.4, 400, 467, 701/300, 301
See application file for complete search history.

(56) References Cited

U.S. PATENT DOCUMENTS

| | | | |
|---|---|---|---|
| 4,002,983 A | 1/1977 | Kavalir et al. | |
| 6,330,499 B1 * | 12/2001 | Chou et al. | 701/31.4 |
| 7,580,697 B2 | 8/2009 | Lappe et al. | |
| 2002/0035521 A1 | 3/2002 | Powers | |
| 2002/0099498 A1 * | 7/2002 | Hilleary | 701/200 |
| 2008/0015748 A1 * | 1/2008 | Nagy | 701/33 |
| 2008/0161988 A1 | 7/2008 | Oesterling et al. | |
| 2008/0207163 A1 | 8/2008 | Shimizu | |

(Continued)

FOREIGN PATENT DOCUMENTS

| | | | |
|---|---|---|---|
| EP | 1302752 A2 * | 4/2003 | |
| EP | 1909069 A1 * | 4/2008 | |
| JP | 2010-25910 | 2/2010 | |

OTHER PUBLICATIONS

Thrity Car Rental TRIPSAVER Benefits, 2009, http://web.archive.org/web/20090404155011/http://www.thrifty.com/TravelCenter/TravelTools/TRIPSAVER.aspx.*
AAA Carolinas Member Guide, 2011, AAA.*

(Continued)

*Primary Examiner* — Fadey Jabr
*Assistant Examiner* — Thomas Ingram
(74) *Attorney, Agent, or Firm* — Fay Sharpe LLP

(57) ABSTRACT

Systems and methods of providing road service to an operator of a vehicle are provided. Such systems and methods presuppose a navigation system of the vehicle is set to route the vehicle to a destination. A road service request from the vehicle is received and a waypoint along the route to the destination is calculated. The navigation system is remotely set to route the vehicle to the waypoint and road service at the waypoint is ordered. The road service includes swapping the vehicle with a new vehicle.

20 Claims, 5 Drawing Sheets

(56) References Cited

U.S. PATENT DOCUMENTS

| | | | |
|---|---|---|---|
| 2009/0076835 | A1 | 3/2009 | Carter et al. |
| 2010/0094496 | A1* | 4/2010 | Hershkovitz et al. ............ 701/22 |
| 2010/0136944 | A1* | 6/2010 | Taylor et al. ............... 455/404.1 |
| 2010/0305807 | A1* | 12/2010 | Basir et al. ...................... 701/33 |
| 2011/0153143 | A1* | 6/2011 | O'Neil et al. ................... 701/29 |
| 2012/0191289 | A1* | 7/2012 | Guo et al. .................... 701/29.1 |
| 2012/0259665 | A1* | 10/2012 | Pandhi et al. ...................... 705/4 |

OTHER PUBLICATIONS

"Nissan Starting to Accept Reservations for its Leaf", article located at: http://sunpluggers.com/2010/02/how-to-reserve-a-nissan-leaf-electric-car-000092.php.

"Leaf to be sold with battery pack at C-segment price", article located at: http://www.sae.org/mags/aei/7714.

Research Disclosure Database No. 444086, Motor Vehicle Maintenance and Service Advisor, Research Disclosure Journal, ISSN 0374-4353.

* cited by examiner

BATTERY ENERGY EMERGENCY ROAD SERVICE

BACKGROUND

The present exemplary embodiments relate to emergency road service. They find particular application in conjunction with battery electric vehicles (BEVs), and will be described with particular reference thereto. However, it is to be appreciated that the present exemplary embodiments are also amenable to other like applications.

BEVs are expected to become more prevalent in the future as the world moves away from fossil fuels. However, currently, battery technology and the lack of public infrastructure are limiting the adoption of BEVs. Namely, battery technology has not yet advanced to the point of allowing a BEV the same range as a gas powered vehicle or the same convenience of refilling as a gas powered vehicle. Further, public infrastructure supporting BEVs is lacking; there are few public charging stations.

Partially addressing these concerns, there are plans to expand public infrastructure to include new public charging spots for BEVs. However, even with the enhancements to public infrastructure, BEV customers remain anxious about venturing outside the driving range of a BEV. They fear that they will get stranded in an unfamiliar area due to a drained battery.

So as to reduce customer anxiousness, many solutions have been proposed. Among these solutions, systems have been devised that optimize routes traveled by a BEV by providing vehicle traffic and infrastructure information to a customer and/or a navigation system of the BEV. However, studies have shown that these solutions are not enough to eliminate customer anxiousness.

The present disclosure contemplates new and improved systems and/or methods for reducing customer anxiousness.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to an aspect of the present disclosure, a method of providing road service to an operator of a vehicle is provided. Suitably, the method is carried out using a processor, and a navigation system of the vehicle is set to route the vehicle to a destination. A road service request from the vehicle is received and a waypoint along the route to the destination is calculated. The navigation system is remotely set to route the vehicle to the waypoint and road service at the waypoint is ordered. The road service includes swapping the vehicle with a new vehicle.

According to another aspect of the present disclosure, a system for providing road service to an operator of a vehicle is provided. Suitably, a navigation system of the vehicle is programmed to route the vehicle to a destination. The system includes an interface associated with a communications network. The interface facilitates communications between the system and the vehicle over the communications network. The system further includes a processor that receives a road service request from the vehicle. The processor remotely programs the navigation system to route the vehicle to a waypoint along the route to the destination. Additionally, the processor orders road service at the waypoint. The road service includes swapping the vehicle with a new vehicle.

According to another aspect of the present disclosure, a method of receiving road service for a vehicle is provided. Suitably, the method is carried out using a processor, and a navigation system of the vehicle is set to route the vehicle to a destination. Road service is requested from a service provider, where the road service includes swapping the vehicle with a new vehicle. Further, a waypoint along the route to the destination is received from the service provider and the navigation system is set to route the vehicle to the waypoint.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
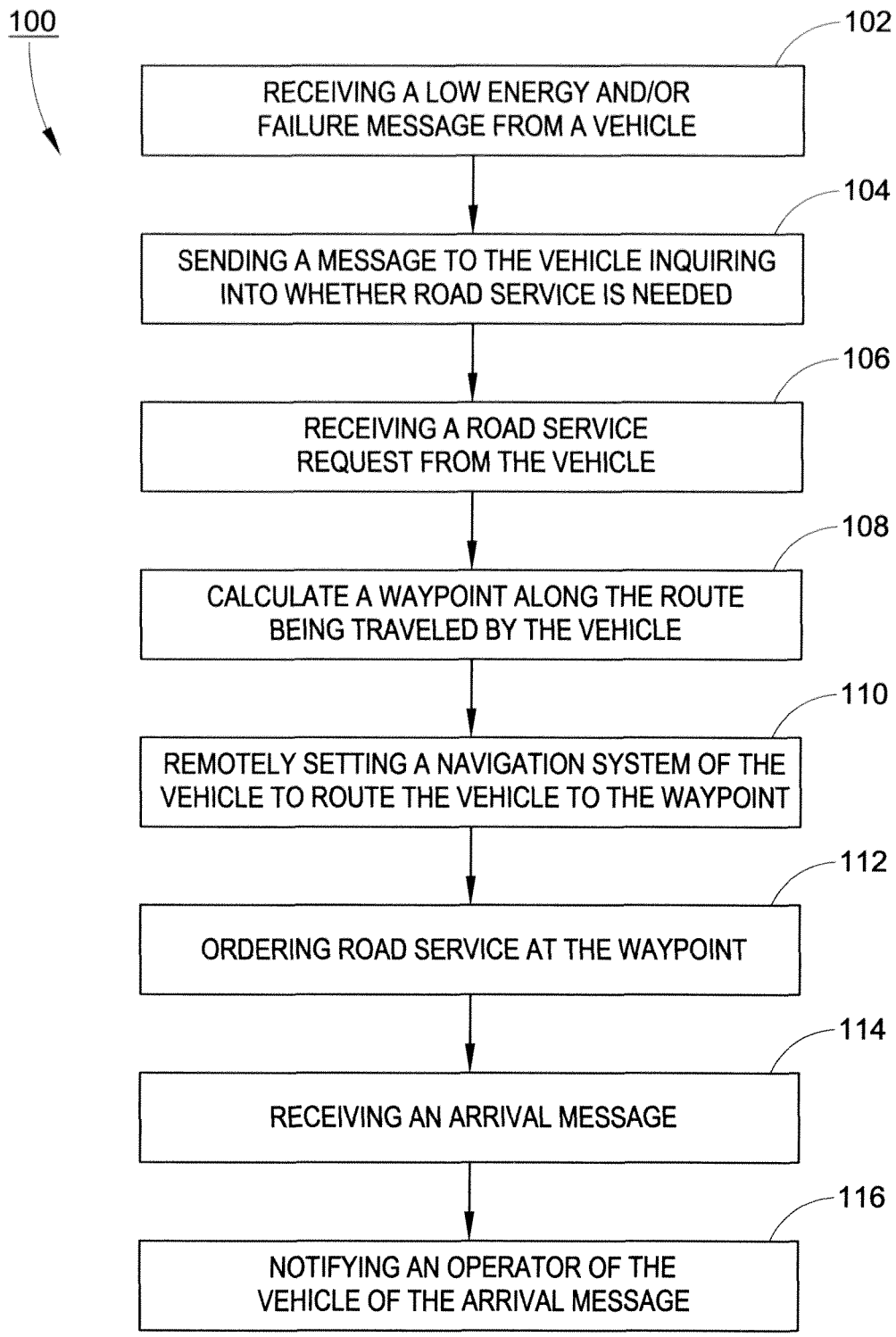
FIG. 1 is block diagram of a method of providing road service to an operator of a vehicle.

One or more embodiments or implementations are hereinafter described in conjunction with the drawings, where like reference numerals are used to refer to like elements throughout, and where the various features are not necessarily drawn to scale.

With reference to FIG. 1, a block diagram is illustrated of a method 100 of providing road service to an operator of a vehicle. A service provider having the capacity to provide road service and/or order road service from a third party suitably performs the method 100. For example, an emergency road service center, such as AAA, may perform the method 100.

The vehicle is suitably a battery electric vehicle having a navigation system therein. However, other vehicles having navigation systems are equally amenable. For example, the vehicle may alternatively be a gas powered vehicle or a hybrid-electric vehicle. The navigation system may use GPS to route the vehicle to a destination, but other means of navigation are equally amenable. Further, the navigation system may be built into the vehicle or a portable GPS unit having the ability to interface with the vehicle.

The operator of the vehicle is suitably a party having the ability to control the vehicle, such as the driver thereof. Further, the operator is suitably traveling to a destination programmed into the navigation system of the vehicle. In certain embodiments, the navigation system may be routing the vehicle to the destination by providing the operator with driving instructions.

A wireless communications network suitably allows the exchange of messages between the service provider and the vehicle (or operator). The wireless communications network may, for example, be a CDMA communications network. In certain embodiments, voice messages may be exchanged. For example, a representative of the service provider may call the vehicle using the wireless communications network so as to exchange messages with the operator. As another example, the operator of the vehicle may call the service provider using the wireless communications network so as to exchange messages with the service provider.

The method 100 may include receiving a low energy and/or failure message from the vehicle (Action 102), sending a message to the vehicle inquiring into whether road service is needed (Action 104), receiving a road service request from the vehicle (Action 106), calculating a waypoint along the route being traveled by the vehicle (Action 108), remotely setting the navigation system of the vehicle to route the vehicle to the waypoint (Action 110), ordering road service at the waypoint (Action 112), receiving an arrival message (Action 114), and notifying the operator of the vehicle of the arrival message (Action 116).

The receiving of a low energy and/or failure message from the vehicle (Action 102) provides notice to the service provider of trouble with the vehicle. In certain embodiments, the message provides notice of a failure of the vehicle, such as a flat tire or an engine failure. In other embodiments, the messages provides notice that the vehicle is low on energy. Low energy may correspond to, for example, a low battery level or a low fuel level, where the former is particularly relevant to a battery electric vehicle and the latter is particularly relevant to gas or diesel vehicle.

The vehicle may automatically send the low energy and/or failure message if low energy and/or failure are detected and/or the severity of detected problems exceeds a threshold. Alternatively, the operator of the vehicle may manually send the low energy and/or failure message through, for example, a button located on the console of the vehicle or a portable communications device, such as a cell phone. The operator may be prompted to do so with notices and/or warnings provided by the vehicle. For example, a low energy and/or failure notice and/or warning may appear on a display of the navigation system of the vehicle upon detection of low energy and/or failure. The vehicle may use onboard sensors and/or control systems to detect trouble with the vehicle.

The sending of a message to the vehicle inquiring into whether road service is needed (Action 104) is generally responsive to receipt of a low energy and/or failure message. In certain embodiments, the message may be presented to the operator through the vehicle. For example, a display of the navigation system of the vehicle may display the message to operator. As another example, a representative of the service provider may call the vehicle and communicate with the operator through the vehicle. Alternatively, in other embodiments, the message may be presented to the operator through a portable communications device, such as a cell phone, carried by the operator.

The receiving of a road service request from the vehicle (Action 106) notifies the service provider that the operator of the vehicle desires road service. The road service request suitably includes vehicle information, which provides the service provider with information necessary to provide road service. Vehicle information may include, but is not limited to, the destination to which the vehicle is traveling and/or the route created by the navigation system of the vehicle.

The road service request message may be sent in response to the inquiry of Action 104. Alternatively, the vehicle or the operator may send the road service request message. With regards to the vehicle sending the request, the road service request message may be sent automatically if a condition requiring road service is detected and/or the severity of detected condition exceeds a threshold. For example, such a condition might be low energy and/or failure. With regards to the operator sending the request, the operator may send the road service request message, for example, by selecting a road service button on the console of the vehicle. The vehicle may also prompt the operator to send a road service request message upon the happening of low energy and/or a failure.

The calculating a waypoint along the route being traveled by the vehicle (Action 108) determines where road service is to be provided. Suitably the waypoint is calculated so as to minimize interruption of the operator's journey to the destination. The calculation may consider any number of factors, such as traffic conditions, whether the vehicle is immobilized, and the speed of the vehicle. Further, the calculation may be based upon the vehicle information included within the road service request of Action 106. For example, destination information and/or route information included within the road service request may be used to determine the waypoint.

The remotely setting the navigation system to route the vehicle to the waypoint (Action 110) provides the calculated waypoint to the operator of the vehicle in a manner that minimizes distraction and disruption to the operator. Namely, by setting the navigation system to route the operator to the waypoint, the operator does not have to worry about navigation and can rely upon the navigation system to guide the operator through what is likely to be unfamiliar territory. Advantageously, this allows the operator to focus on driving rather than navigation, thereby promoting safe driving practices.

The ordering road service at the waypoint (Action 112) orders a road service crew to meet the operator of the vehicle at the waypoint and provide road service to the operator. The road service crew may be associated with the service provider or, alternatively, independent thereof. Road service may include, but is not limited to, one or more of providing a new vehicle, towing the vehicle to a location specified by the operator of the vehicle or someone associated therewith, and refueling or recharging the vehicle.

As to providing a new vehicle, the operator of the vehicle may use the new vehicle to continue to the destination they began traveling to with the vehicle. The new vehicle may, for example, be a loaner car. Further, the new vehicle may include a navigation system similar to that of the vehicle. In such a case, the navigation system thereof may be set to route the new vehicle to the destination. The destination may be derived from the vehicle information and set remotely by the service provider.

As to towing the vehicle, the vehicle may be towed by the road service crew to a location specified by the operator (e.g., the operator's home). Alternatively, the location may be specified by one associated with the operator, such as a family member. The location may be provided to the service provider as part of the vehicle information or it may be included with account information the operator has with the service provider. As to the former, the location may be preprogrammed in to the vehicle or specified at the time of requesting road service.

The receiving an arrival message (Action 114) notifies the service provider that the vehicle of the operator has arrived at the location. Namely, in situations where the road service includes towing the vehicle to a location, the road service crew may send a notice to the service provider that the vehicle has been successfully towed to the location.

The notifying the operator of the vehicle of the arrival message (Action 116) is suitably sent in response to receiving the arrival message (Action 114). The notice may be sent to the operator via the new vehicle in the same way messages are presented to the operator via the vehicle. For example, the message may be presented to the operator through a display of the navigation system. Alternatively, or in addition, the notice may be sent to the operator via a portable communications device, such as a cell phone.

Figure 2:
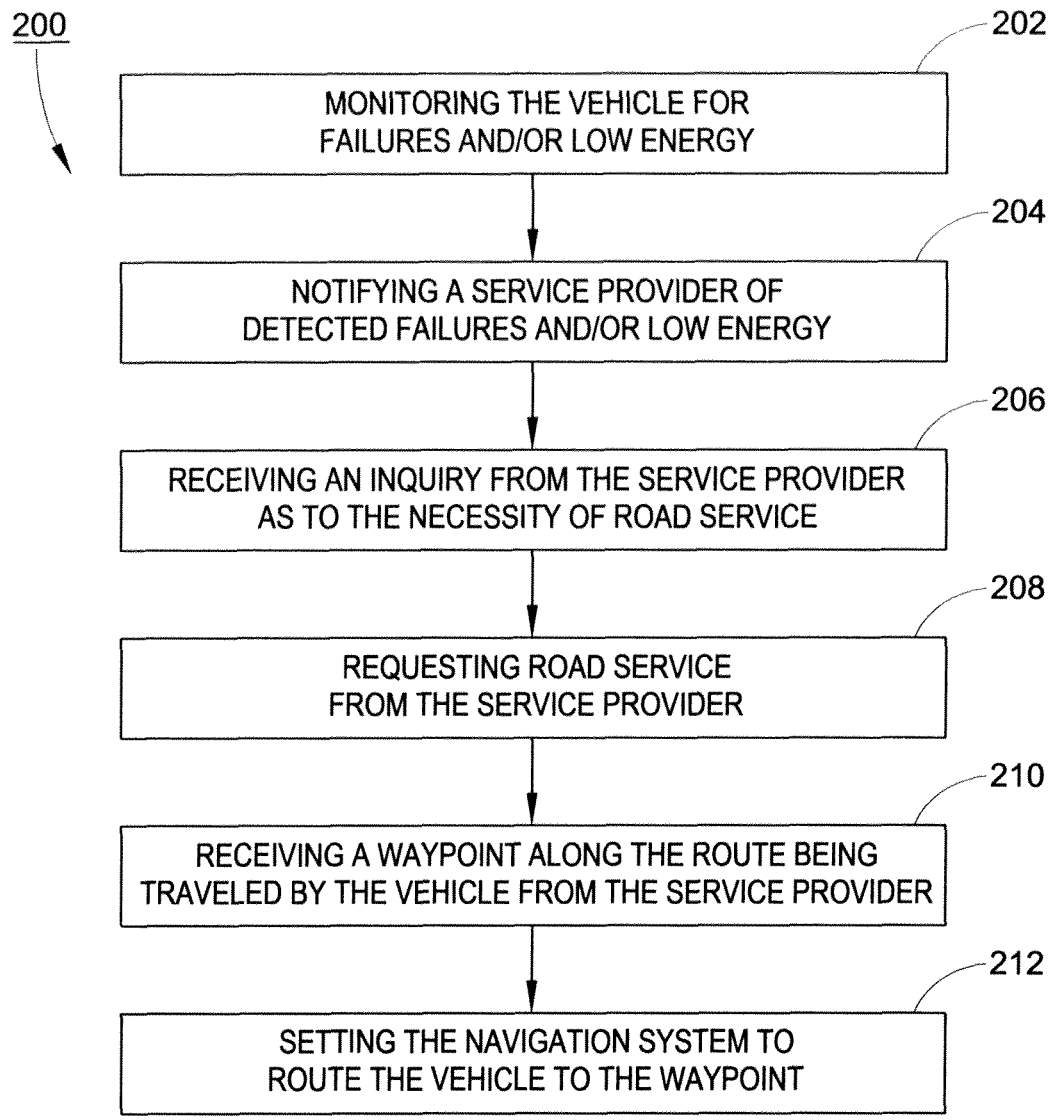
FIG. 2 is block diagram of a method of receiving road service for a vehicle.

With reference to FIG. 2, a block diagram is illustrated of a method 200 of receiving road service for a vehicle. Road service may include, but is not limited to, one or more of providing a new vehicle, towing the vehicle to a location specified by the operator of the vehicle or someone associated therewith, and refueling or recharging the vehicle. Further, the road service is suitably requested from a service provider having the capacity to provide road service and/or order road service from a third party. For example, an emergency road service center, such as AAA.

The vehicle is suitably a battery electric vehicle having a navigation system therein. However, other vehicles having navigation systems are equally amenable. For example, the vehicle may alternatively be a gas powered vehicle or a hybrid-electric vehicle. The navigation system may use GPS to route the vehicle to a destination, but other means of navigation are equally amenable. Further, the navigation system may be built into the vehicle or a portable GPS unit having the ability to interface with the vehicle.

An operator of the vehicle having the ability to control the vehicle suitably performs the method 200. For example, the driver of the vehicle may perform the method 200. Further, the operator is suitably traveling to a destination programmed into the navigation system of the vehicle. In certain embodiments, the navigation system may be routing the vehicle to the destination by providing the operator with driving instructions.

A wireless communications network suitably allows the exchange of messages between the service provider and the vehicle (or operator). The wireless communications network may, for example, be a CDMA communications network. In certain embodiments, voice messages may be exchanged. For example, a representative of the service provider may call the vehicle using the wireless communications network so as to exchange messages with the operator. As another example, the operator of the vehicle may call the service provider using the wireless communications network so as to exchange messages with the service provider.

The method 200 may include monitoring the vehicle for failures and/or low energy (Action 202), notifying the service provider of detected failures and/or low energy (Action 204), receiving an inquiry from the service provider as to the necessity of road service (Action 206), requesting road service from the service provider (Action 208), receiving a waypoint along the route being traveled by the vehicle from the service provider (Action 210), and setting the navigation system to route the vehicle to the waypoint (Action 212).

The monitoring the vehicle for failures and/or low energy (Action 202) may be accomplished with vehicle sensors and/or control systems. Failures include problems, such as a flat tire or an engine failure. Further, low energy may correspond to, for example, a low battery level or a low fuel level, where the former is particularly relevant to a battery electric vehicle and the latter is particularly relevant to gas or diesel vehicle.

The notifying a service provider of detected failures and/or low energy (Action 204) provides notice to the service provider of trouble, thereby allowing the service provider to coordinate road service. The vehicle may automatically provide notice of low energy and/or failure if low energy and/or failure are detected and/or the severity of detected problems exceeds a threshold. Alternatively, the operator of the vehicle may manually send the low energy and/or failure message through, for example, a button located on the console of the vehicle. The operator may also be prompted to do so with notices and/or warnings provided by the vehicle upon the happening of low energy and/or a failure. For example, a low energy notice and/or warning may appear on a display of the navigation system of the vehicle.

The receiving an inquiry from the service provider as to the necessity of road service (Action 206) prompts the vehicle and/or the operator to decide whether road service is necessary. In certain embodiments, the inquiry may be presented to the operator through the vehicle. For example, a display of the navigation system of the vehicle may display the message to operator. As another example, a representative of the service provider may call the vehicle and communicate with the operator through the vehicle. Alternatively, in other embodiments, the message may be sent to the operator via a portable communications device, such as a cell phone, carried by the operator.

The requesting road service from a service provider (Action 208) prompts the service provider take appropriate action to provide road service to the operator. The request suitably includes vehicle information, which provides the service provider with information necessary to provide road service. Vehicle information may include, but is not limited to, the destination to which the vehicle is traveling and/or the route created by the navigation system of the vehicle. The vehicle information may be preprogrammed into onboard computers of the vehicle and/or received from user input device, such as a touch screen display of a navigation system, when the road service is requested.

The road service request message may be sent in response to the inquiry of Action 206. Alternatively, the vehicle or the operator may send the road service request message. With regards to the vehicle sending the request, the road service request message may be sent automatically if a condition requiring road service is detected and/or the severity of detected condition exceeds a threshold. For example, such a condition might be low energy and/or failure. With regards to the operator sending the request, the operator may send the road service request message, for example, by selecting a road service button on the console of the vehicle. The vehicle may also prompt the operator to send a road service request message upon the happening of low energy and/or a failure.

The receiving a waypoint along the route being traveled by the vehicle from a service provider (Action 210) provides the vehicle and/or operator the location where road service will be provided. Suitably the waypoint is calculated by the service provider so as to minimize interruption of the operator's journey to the destination.

The setting the navigation system to route the vehicle to the waypoint (Action 212) provides the calculated waypoint to the operator of the vehicle in a manner that minimizes distraction and disruption to the operator. Namely, by setting the navigation system to route the operator to the waypoint, the operator does not have to worry about navigation and can easily navigate through what is likely to be unfamiliar territory. Advantageously, this allows the operator to focus on driving rather than navigation, thereby promoting safe driving practices.

Figure 3A:
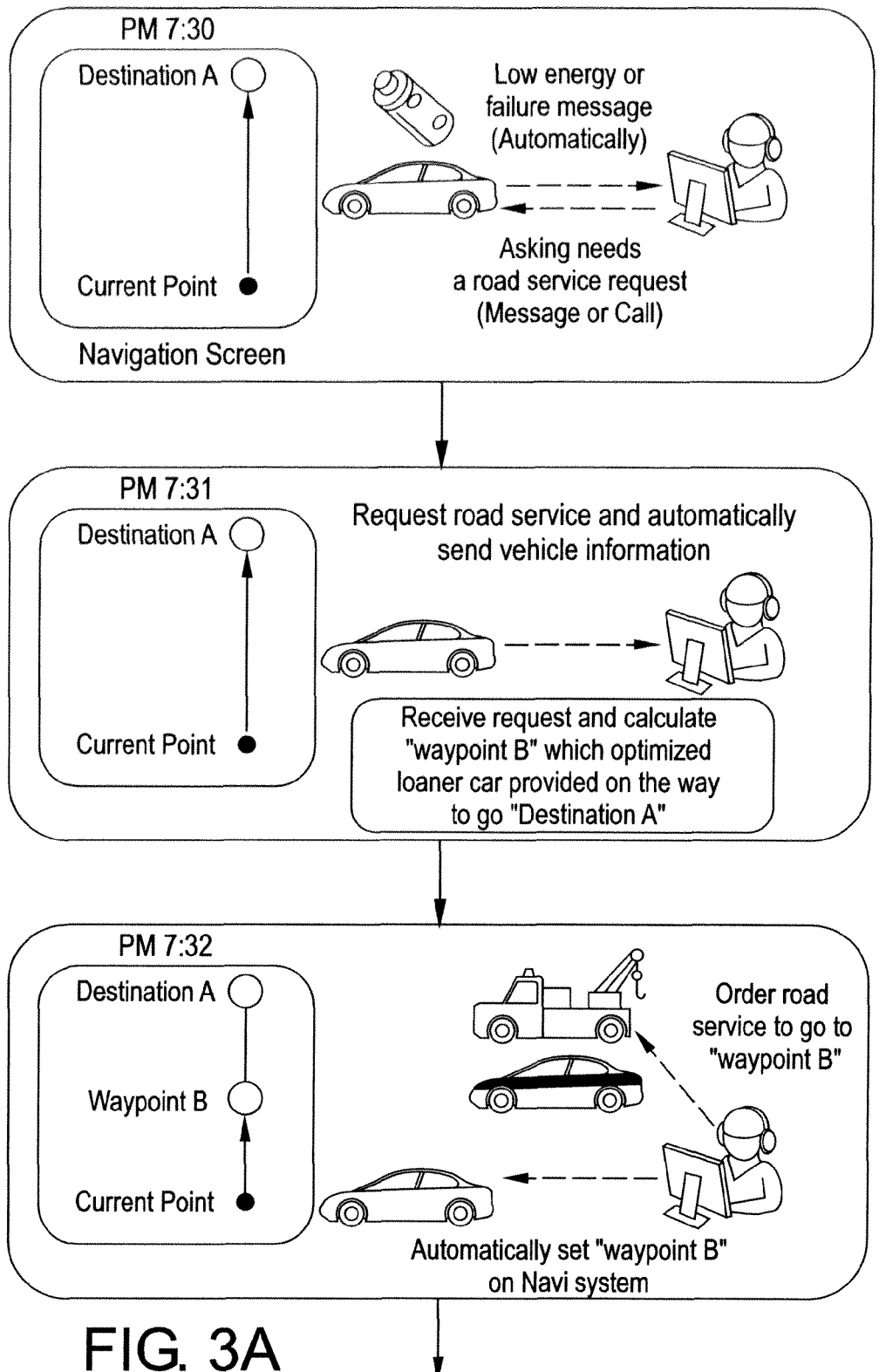
FIGS. 3A and 3B are an example of the method 100 of FIG. 1 and/or the method 200 of FIG. 2.
Figure 3B:
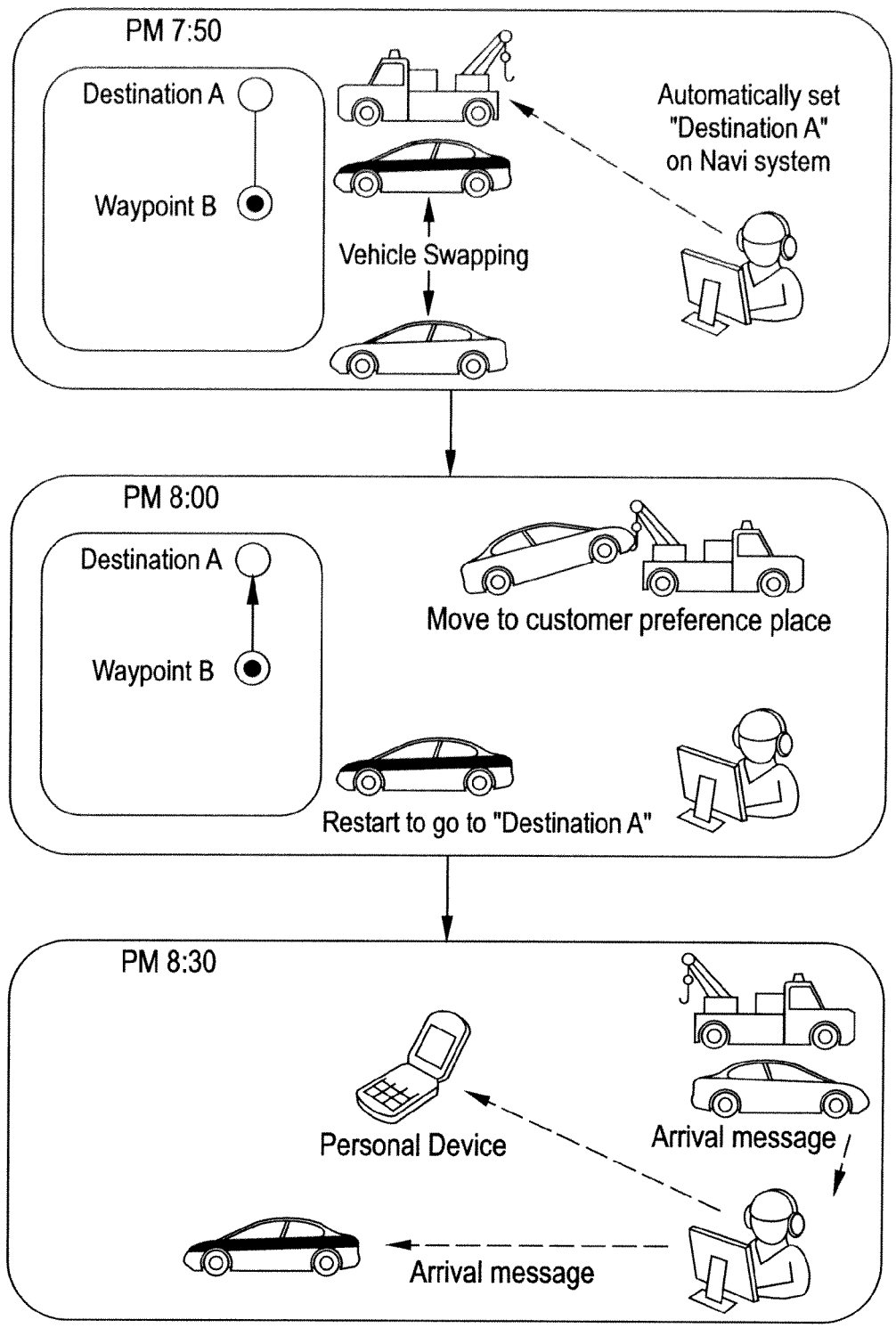

With reference to FIGS. 3A and 3B, a practical example is illustrated of the method 100 of FIG. 1 and/or the method 200 of FIG. 2 in which an operator of a battery electric vehicle is traveling to a destination A and needs road service. In this example, the vehicle includes a navigation system set to route the vehicle to the destination A.

At 7:30 PM, the vehicle automatically sends a low energy and/or failure message to the service provider. For example, the battery level of the vehicle is determined to be low. Suitably, a wireless network, such as a cellular communications network, is used to provide notice to the service provider. The service provider, upon receiving this message, then inquires into whether road service is necessary. The inquiring may be performed via voice communication, such as a call, or via electronic communication, such as text message.

At 7:31 PM, the vehicle and/or operator thereof respond to the service provider's inquiry as to the necessity of road service with a request for road service. Suitably, the request for road service includes vehicle information which is automatically sent as part of the request for road service. The vehicle information may include the destination A and/or any other route information. Using this vehicle information, the service provider calculates a waypoint B, which is a point along the route to the destination A where the operator is to receive road service.

At 7:32 PM, the service provider orders road service to the waypoint B. For example, the service provider may contact a road service crew local to the waypoint B and instruct them to meet the operator of the vehicle at the waypoint B. The service provider further sets the waypoint B on the navigation system of the vehicle automatically. For example, the service provider may send the waypoint B to the vehicle with instructions to set the navigation system.

At 7:50 PM, the vehicle meets up with the road service crew at the waypoint B. At the waypoint B, the operator of the vehicle swaps the vehicle for a new vehicle provided by the road service crew. The new vehicle is loaned to the operator for the duration of their journey to the destination A and, similar to the vehicle, includes a navigation system set for the destination A. Suitably, the destination A is set automatically by the service provider.

At 8:00 PM, the operator (i.e., the customer of the service provider) resumes their journey to the destination A in the new vehicle. Further, the vehicle is towed to a location preferred by the operator or one associated with the operator. For example, the operator may desire to have the vehicle towed to their home.

At 8:30 PM, the service provider receives notice from the road service crew that the vehicle has been safely towed to the location. Upon receiving this message, the service provider suitably notifies the operator thereof. This may be accomplished in any number of ways including by way of the new vehicle and/or a personal communications device, such as a cell phone.

Figure 4:
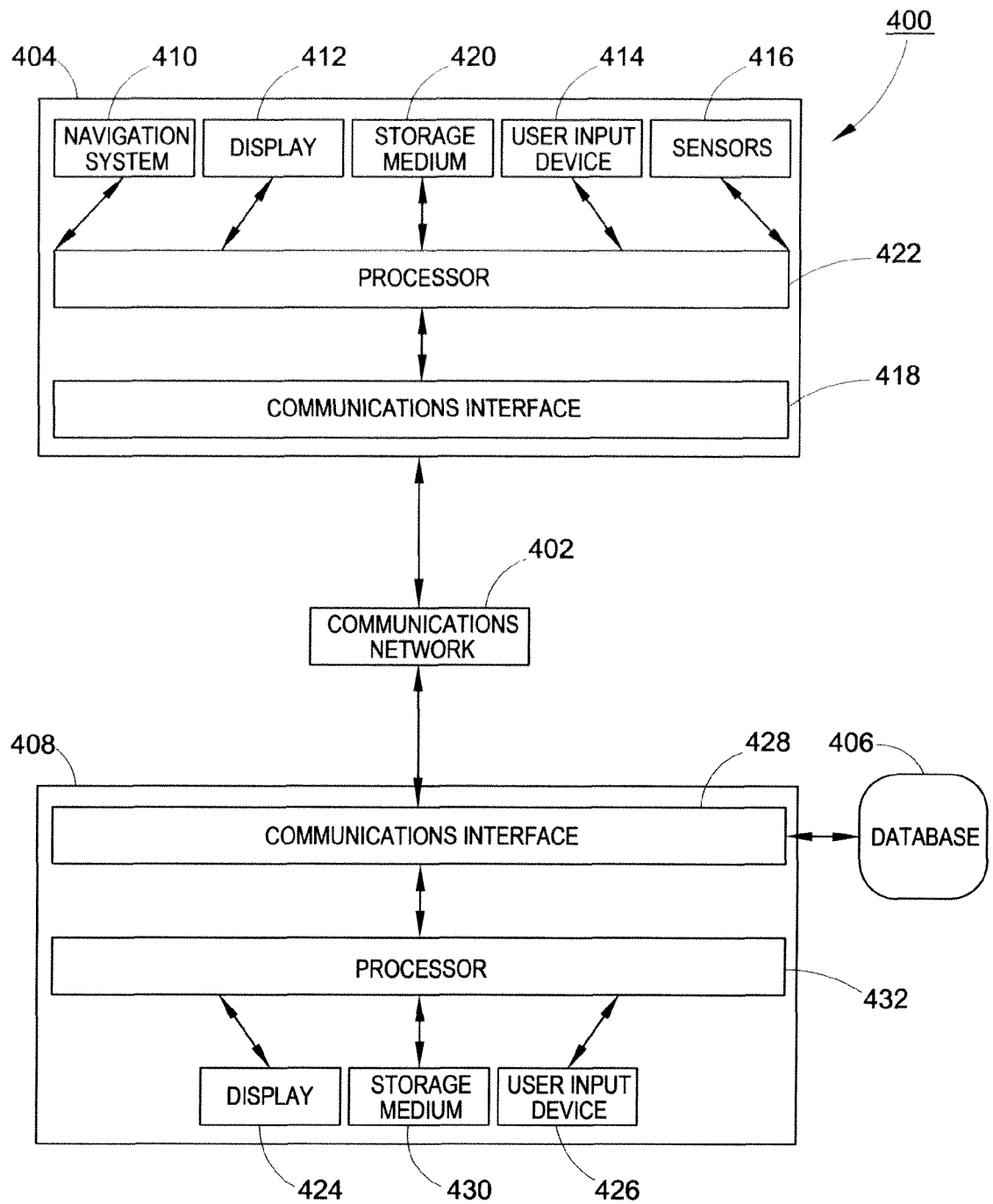
FIG. 4 is diagram of a system employing the method of FIG. 1 and/or the method of FIG. 2.

With reference to FIG. 4, a system 400 is illustrated employing the method of FIG. 1 and/or the method of FIG. 2. The system 400 may include a communications network 402, a vehicle 404, a database 406, and a road service system 408. The communications network 402 allows the vehicle 404 and the road service system 408 to exchange messages. Suitably, the communications network 402 is a wireless communications network, such as a CDMA communications network.

A party having the ability to control the vehicle 404, such as the driver thereof, operates the vehicle 404. The vehicle 404 suitably carries out the method 200 of FIG. 2 and is suitably a battery electric vehicle having a navigation system therein. However, other vehicles having navigation systems are equally amenable. The vehicle 404 may include a navigation system 410, a display 412, a user input device 414, sensors 416, a communications interface 418, a storage medium 420, and a processor 422.

The navigation system 410 suitably uses GPS to route the vehicle 404 to a destination, but other means of navigation are equally amenable. The display 412 allows messages, warnings, notices, and the like to be presented to the operator of the vehicle 404. The user input device 414 allows the vehicle 404 to receive input from the operator and may be, for example, by way of a touch screen display. In certain embodiments, the display 412 and/or the user input device 414 are part of the navigation system 410. The sensors 416 facilitate the detection of low energy and/or failures with the vehicle 404. The communications interface 418 facilitates communications between the road service system 408 and the vehicle 404 over the communications network 402.

The storage medium 420 may include executable instructions for carrying out the method 200 of FIG. 2. Further, the storage medium 420 may be a magnetic disk or other magnetic storage medium; an optical disk or other optical storage medium; a random access memory (RAM), read-only memory (ROM), or other electronic memory device or chip or set of operatively interconnected chips; or so forth.

The processor 422 may be a microprocessor, microcontroller, graphic processing unit (GPU), and the like. Suitably, the processor 422 executes executable instructions on the storage medium 420 and coordinates the components of the vehicle 404, such as the navigation system 410, so as to carry out the method 200 of FIG. 2. For example, the processor 422 monitors the sensors 416 for low energy and/or failures. Further, the processor 422 receives messages made to the vehicle 404 and acts on said messages according to the method 200 of FIG. 2. In processing and acting on these messages, the processor 422 may, but need not necessarily, seek input from the operator via the user input device 414.

The database 406 is suitably maintained by a service provider and includes account records of customers of the service provider, such as the operator or one associated with the operator. An account record might include, for example, billing information, a name and address of the account holder, an identification number used by the vehicle 404 to identify itself to the road service system 408, information pertaining to pending requests for road service, and other like data fields. The database 406 may be, for example, a SQL-based database and/or embodied by a computer server.

A service provider having the capacity to provide road service and/or order road service from a third party maintains and operates the road service system 408. Particularly, a representative of the service provider may operate the road service system 408. The road service system 408 suitably carries out the method 100 of FIG. 1 and may include a display 424, a user interface 426, a communications interface 428, a storage medium 430, and a processor 432.

The display 424 and the user input device 426 allow the representative of the service provider to interact with the road service system 408 and provide road service to an operator. For example, the representative might communicate with the operator after receiving notice of low energy and/or failure from the vehicle 404, so as to determine whether road service is necessary. The communications interface 428 facilitates communications between the road service system 408 and the vehicle 404 over the communications network 402. Further, the communications interface 428 may also facilitate communications with the database 406 via a communications network, such as the Internet or a local area network.

The storage medium 430 may include executable instructions for carrying out the method 100 of FIG. 1. Further, the storage medium 430 may include a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

The processor 432 may be a microprocessor, microcontroller, graphic processing unit (GPU), and the like. Further, the processor 432 suitably coordinates the components of the road service system 408 so as to carry out the method 100 of FIG. 1. The processor 432 receives and processes messages from the vehicle 404 and acts on said messages according to the method 100 of FIG. 1. In processing and acting on these messages, the processor 432 may, but need not necessarily, seek input from the representative via the user input device 426. For example, when the processor 432 receives a message from the vehicle 404, the processor 432 may prompt the representative thereof via the display 424 for instructions as to how to proceed.

In certain embodiments, a general purpose computer may embody the road service system 408. Further, notwithstanding that only a single road service system is shown in FIG. 4, it is to be appreciated that a service provider may have a plurality of road service systems interfacing with the database 408. Namely, the service provider may have a service center of representatives and road service systems for processing road service requests, low energy and/or failure messages and the like.

The exemplary embodiments have been described with reference to the preferred embodiments. Obviously, modifications and alterations will occur to others upon reading and understanding the preceding detailed description. It is therefore intended that the exemplary embodiments be construed as including all such modifications and alterations insofar as they come within the scope of the appended claims or the equivalents thereof.

The invention claimed is:

1. A method of providing road service to an operator of a vehicle, wherein a navigation system of the vehicle is set to route the vehicle to a destination, said method comprising:
by the navigation system of the vehicle, calculating a route to the destination; and
by a service provider remote from the vehicle:
receiving with at least one processor one of a low energy and failure message from the vehicle over a communication network;
in response to receiving the low energy or failure message, sending with the at least one processor a message to the vehicle inquiring into whether road service is needed over the communication network;
in response to the inquiry, receiving with the at least one processor a road service request from the vehicle over the communication network, the request including the route calculated by the navigation system; and
in response to the request:
calculating with the at least one processor a waypoint on the route to the destination based on the received request;
remotely with the at least one processor setting the navigation system to route the vehicle to the waypoint over the communication network; and
ordering with the at least one processor road service at the waypoint, wherein the road service includes swapping the vehicle with a new vehicle at the waypoint.

2. The method of claim 1, wherein the vehicle is a battery electric vehicle and the message is low energy.

3. The method of claim 1, wherein the road service request is sent automatically by the vehicle upon detection of one of failure and low energy.

4. The method of claim 1, wherein the road service further includes towing the vehicle to the vehicle operator home.

5. The method of claim 4, further comprising:
receiving an arrival message that the vehicle arrived at the location; and
notifying the operator that the vehicle arrived at the location.

6. The method of claim 1, wherein the road service request includes information about the vehicle.

7. The method of claim 1, wherein a navigation system of the new vehicle is set to route the new vehicle to the destination.

8. The method of claim 1, wherein the disabled vehicle is towed to a facility of a road service provider.

9. The method of claim 1, wherein the vehicle is towed to the vehicle operator's home.

10. The method of claim 1, wherein the new vehicle includes a navigation system having a route preset to the destination.

11. A system for providing road service to an operator of a vehicle, wherein a navigation system of the vehicle is programmed to route the vehicle to a destination, said system comprising:
an interface associated with a communications network, wherein the interface facilitates communications between the system and the vehicle over the communications network; and
a processor remote from the vehicle that:
receives one of a low energy and failure message from the vehicle over the communications network;
in response to the low energy and failure message, sends a message to the vehicle inquiring into whether road service is needed over the communication network;
in response to the inquiry, receives a road service request from the vehicle over the communication network, the request including a route to the destination calculated by the navigation system; and
in response to the request:
calculates a waypoint on the route to the destination based on the received request;
remotely programs the navigation system to route the vehicle to the waypoint over the communication network; and
orders road service at the waypoint, wherein the road service includes swapping the vehicle with a new vehicle at the waypoint.

12. The system of claim 11, wherein the road service further includes towing the vehicle to the vehicle operator home.

13. The system of claim 12, wherein the processor receives an arrival message that the vehicle arrived at the location and notifies the operator that the vehicle arrived at the location.

14. The system of claim 11, wherein the vehicle generates one of the low energy and failure message automatically.

15. The system of claim 14, wherein the vehicle is a battery electric vehicle and the message is low energy.

16. A method of receiving road service for a vehicle, wherein a navigation system including a processor of the vehicle is set to route the vehicle to a destination, said method comprising:
by the navigation system of the vehicle:
calculating with the processor a route to the destination;
routing with the processor the vehicle to the destination according to the calculated route;
while routing the vehicle to the destination according to the calculated route, monitoring with the processor the vehicle for one of failure and low energy;
notifying with the processor a service provider of one of detected failures and low energy over a communication network, the vehicle and the navigation system remote from the service provider;

in response to the notification, receiving with the processor an inquiry from the service provider as to the necessity of road service over the communication network;

in response to the inquiry, requesting with the processor road service from the service provider over the communication network, wherein the road service includes swapping the vehicle with a new vehicle;

in response to the request:
  receiving with the processor a waypoint on the route to the destination from the service provider over the communication network; and
  setting with the processor the navigation system to route the vehicle to the waypoint where the vehicle swapping occurs.

17. The method of claim 16, further comprising:
monitoring the vehicle for one of failure and low energy, wherein the requesting is performed upon detection of the one of failure and low energy.

18. The method of claim 17, wherein the vehicle is a battery electric vehicle and low energy is detected.

19. The method of claim 16, wherein the road service includes towing the vehicle to a location specified by an operator thereof.

20. The method of claim 16, wherein the road service request includes vehicle information.

* * * * *